United States Patent [19]

Loew et al.

[11] 4,421,519
[45] Dec. 20, 1983

[54] MIXTURES OF CATIONIC DYES: NAPHTHO-LACTAM AND OXAZINE DYES FOR POLYACRYLONITRILES

[75] Inventors: Peter Loew, Münchenstein; Rudolf Zink, Therwil, both of Switzerland

[73] Assignee: Ciba-Geigy Corporation, Ardsley, N.Y.

[21] Appl. No.: 385,596

[22] Filed: Jun. 7, 1982

[30] Foreign Application Priority Data

Jun. 16, 1981 [CH] Switzerland .......................... 3957/81

[51] Int. Cl.³ .......................... D06P 3/76; C09B 57/06
[52] U.S. Cl. .......................................... 8/644; 8/534; 8/657; 8/927
[58] Field of Search .................................. 8/644, 534

[56] References Cited

U.S. PATENT DOCUMENTS

| | | | |
|---|---|---|---|
| 3,801,596 | 4/1974 | Banmann et al. | 544/64 |
| 4,116,622 | 9/1978 | Koller et al. | 8/644 |
| 4,332,937 | 6/1982 | Zink | 544/105 |

FOREIGN PATENT DOCUMENTS

| | | |
|---|---|---|
| 5451 | 11/1979 | European Pat. Off. |
| 57457 | 8/1982 | European Pat. Off. |
| 973259 | 10/1964 | United Kingdom |
| 2001092 | 1/1979 | United Kingdom |

*Primary Examiner*—A. Lionel Clingman
*Attorney, Agent, or Firm*—Edward McC. Roberts

[57] ABSTRACT

There are described novel dye mixtures of the dyes I and II or Ia and II

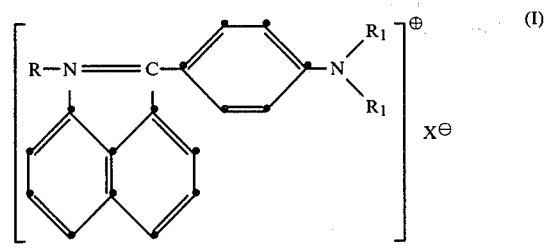

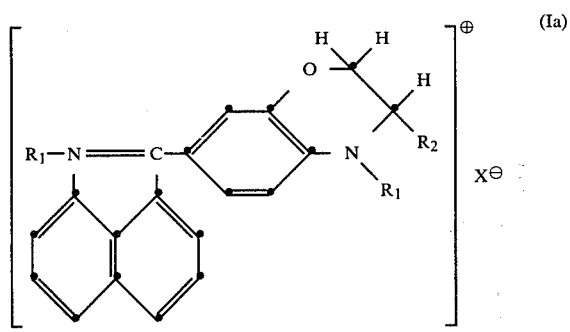

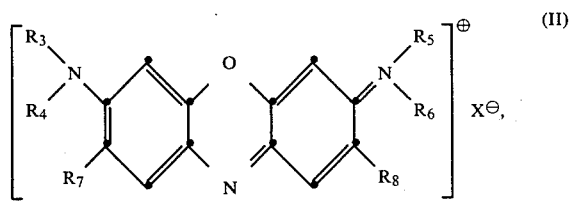

wherein the symbols have the meanings defined in claim 1. These mixtures can be used in particular for dyeing and printing polyacrylonitrile materials, or mixed fabrics of polyacrylonitrile and wool, the dyeings obtained having a clear, deeply colored blue shade and especially a very good evening shade.

16 Claims, No Drawings

MIXTURES OF CATIONIC DYES: NAPHTHO-LACTAM AND OXAZINE DYES FOR POLYACRYLONITRILES

It is known that naphtholactam dyes of the formulae I and Ia

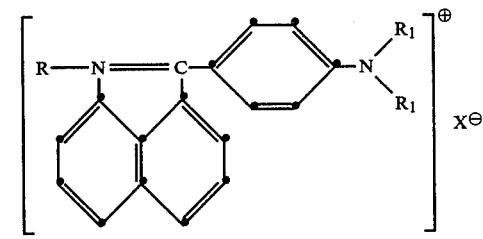

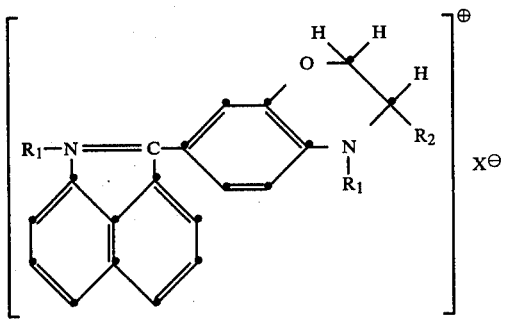

are products which yield good blue dyeings on polyacrylonitrile materials; these dyeings, however, frequently have a poor evening shade in that in artificial light they appear to turn red.

It is also known that oxazine dyes of the formula II

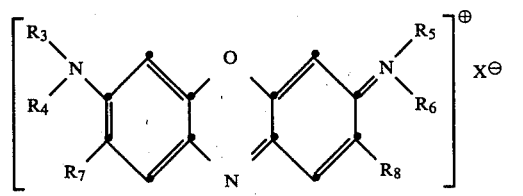

are products which have a level of fastness lower than that of the dyes of the formulae I and Ia, and which likewise produce blue dyeings on polyacrylonitrile materials; these dyeings too, however, have in many cases a poor evening shade in that in artificial light they appear to turn green.

It has now been found that mixtures of the dyes I and II or Ia and II give, on polyacrylonitrile materials, dyeings which surprisingly exhibit the desired clear neutral blue shades having a very good evening colour; furthermore, the clear blue shades obtainable have a high depth of colour and very good general fastness properties.

In the formulae I, Ia and II, the symbols have the following meanings:

R is a $C_1$-$C_4$-alkyl group, which is substituted by CN, COO-alkyl-$C_1$-$C_4$, $CONH_2$, CONH(alkyl-$C_1$-$C_4$) or CON(alkyl-$C_1$-$C_4$)$_2$;

$R_1$'s independently of one another are each an unsubstituted $C_1$-$C_4$-alkyl group or a $C_1$-$C_4$-alkyl group which is substituted by CN, OH, $C_1$-$C_4$-alkoxy, COO-alkyl-$C_1$-$C_4$, $CONH_2$, CONH(alkyl-$C_1$-$C_4$), CON(alkyl-$C_1$-$C_4$)$_2$, or the two $R_1$'s in the formula I form together with the N atom a heterocyclic 5- or 6-membered ring;

$R_2$ is hydrogen, an unsubstituted or substituted $C_1$-$C_4$-alkyl group, or an unsubstituted or substituted aryl group, substituents in the alkyl group $R_2$ being for example $C_1$-$C_4$-alkoxy groups, and substituents in the aryl group $R_2$ for example $C_1$-$C_4$-alkyl groups, $C_1$-$C_4$-alkoxy groups or halogen;

$R_3$ and $R_5$ independently of one another are each hydrogen, a $C_1$-$C_4$-alkyl group, which is unsubstituted or substituted by CN, OH, aryl, halogen or a $C_1$-$C_4$-alkoxy group, or an alkenyl group having 3 or 4 carbon atoms;

$R_4$ and $R_6$ independently of one another are each a $C_1$-$C_4$-alkyl group, which is unsubstituted or substituted by CN, OH, aryl, halogen or a $C_1$-$C_4$-alkoxy group, or are an alkenyl group having 3 or 4 carbon atoms, or $R_4$ and $R_6$ independently of one another are each an unsubstituted phenyl group, or a phenyl group which is substituted for example by a $C_1$-$C_4$-alkyl group, by a $C_1$-$C_4$-alkoxy group or by halogen, and $R_6$ can moreover be hydrogen;

$R_7$ and $R_8$ independently of one another are each hydrogen, a $C_1$-$C_4$-alkyl group or a $C_1$-$C_4$-alkoxy group, and X is an anion.

The $C_1$-$C_4$-alkyl groups mentioned in connection with the symbols R and $R_1$ to $R_8$ are straight-chain or branched-chain alkyl groups, such as the methyl, ethyl, n- or iso-propyl group or the n-, sec- or tert-butyl group.

The $C_1$-$C_4$-alkoxy groups denoted by the symbols $R_1$ to $R_8$ are straight-chain or branched-chain alkoxy groups, such as the methoxy, ethoxy, n- or iso-propoxy group or the n- or iso-butoxy group.

An aryl group for the symbols $R_2$ to $R_6$ is in particular the phenyl group and also the α- or β-naphthyl group; and where these symbols $R_2$ to $R_6$ denote a halogen atom, it is the fluorine, chlorine or bromine atom.

When $R_3$ to $R_6$ are a $C_3$-$C_4$-alkenyl group, it is especially the allyl group.

In the case where the two $R_1$ groups in the formula I together with the N atom form a heterocyclic 5- or 6-membered ring, it is for example the pyrrolidine ring (5-membered) or the morpholine ring (6-membered).

Anions X are the customary organic and inorganic anions for cationic compounds. They are for example the halide ion, such as the chloride, bromide or iodide ion, also the sulfate, methosulfate, aminosulfonate, perchlorate, carbonate, bicarbonate, phosphate, phosphomolybdic, phosphotungstic, phosphotungstomolybdic, benzenesulfonate, 4-chlorobenzenesulfonate, naphthalenesulfonate, oxalate, maleinate, acetate, propionate, lactate, succinate, chloroacetate, tartrate, methanesulfonate or benzoate ions, or complex anions, such as those of chlorine-zinc double salts.

Preferred dye mixtures are those containing a dye of the formula I wherein R is a $C_1$-$C_4$-alkyl group substituted by CN, particularly the ethyl group, and the two $R_1$'s are each the same unsubstituted alkyl group, especially the ethyl group, or dye mixtures containing a dye of the formula Ia wherein the $R_1$ bound to the naphtholactam ring is an unsubstituted $C_1$-$C_4$-alkyl group, particularly the $CH_3$ group, $R_2$ is hydrogen or the methyl or phenyl group, and the $R_1$ bound to the N atom of the morpholino group is $C_1$-$C_4$-alkyl substituted by $C_1$-$C_4$-alkoxy, especially the β-methoxyethyl group. The preferred oxazine dyes of the formula II in the dye mixtures are those wherein $R_3$, $R_4$, $R_5$ and $R_6$ are each the same unsubstituted $C_1$-$C_4$-alkyl group, in particular the $C_2H_5$ group, and $R_7$ and $R_8$ are each hydrogen.

The dyes of the formula I and the production thereof are known for example from the German Offenlegungsschrift No. 1944797 and from G.B. Patent Specification No. 973259, and those of the formula Ia for example from European Patent Application No. 17621; and likewise the dyes of the formula II are known for example from the European Patent Application No. 5451, and can be obtained for example by the processes described therein.

The most interesting mixture ratios between the dyes I and II or between Ia and II are 20–90 percent by weight of the dye I or Ia, and 80–10 percent by weight of the dye II, and preferably 50–80 percent by weight of the dye I or Ia, and 50–20 percent by weight of the dye II.

The dye mixtures of the dyes I and II or Ia and II are suitable for dyeing and printing of materials dyeable with cationic dyes, particularly textile materials which consist completely or largely of polymerised, unsaturated nitriles, such as acrylonitrile and vinylidene cyanide, or of polyesters or polyamides modified by acid groups. Furthermore, these mixtures are suitable for dyeing mixed fabrics and mixed yarns, particularly those made from polyacrylonitrile and wool, and also for dyeing wet tow, plastics materials, leather and paper.

These materials are preferably dyed from an aqueous, neutral or acid medium by the exhaust process, optionally under pressure, or by the continuous process. The textile material can be in the widest variety of forms, for example in the form of fibres, filaments, fabrics, knitwear, piece goods and finished articles. Finally, the dye mixtures according to the invention which are not fast to sublimation can also be used in the transfer printing process.

By application of the novel dye mixtures, it is possible to produce on the stated materials deeply coloured blue dyeings or printings which are characterised by very good general fastness properties, such as fastness to light, decatising, washing and perspiration, by a good evening colour and by a good wool resist.

The invention relates also to the dye mixtures which contain a naphtholactam dye of the formula I and an oxazine dye of the formula II, or a naphtholactam dye of the formula Ia and an oxazine dye of the formula II, the mixture ratios preferred being those given in the foregoing.

In the Examples which follow, 'parts' are parts by weight, percentages are percent by weight, and temperature values are in degrees Centigrade.

EXAMPLE 1

0.42 part of the dye of the formula

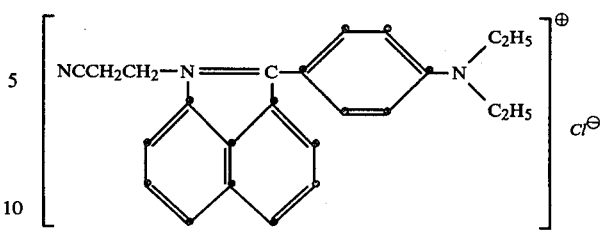

and 0.18 part of the dye of the formula

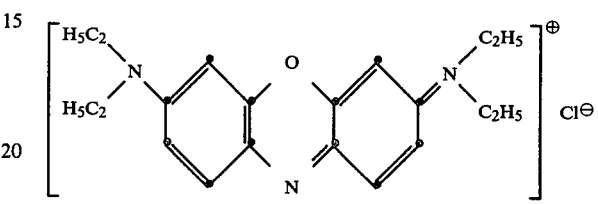

are dissolved in 2000 parts of water with the addition of 4 parts of 40% acetic acid, and to the solution are then added 1 part of crystallised sodium acetate and 10 parts of anhydrous sodium sulfate. Into the dye bath thus obtained are introduced at 60° C. 100 parts of polyacrylonitrile fibres; the temperature is raised within ½ hour to 100° C., and dyeing is performed for 1 hour at the boiling temperature. The result after rinsing and drying is a neutral blue dyeing which exhibits no change of colour in artificial light, and which has excellent fastness to decastising.

EXAMPLE 2

0.3 part of the dye of the formula

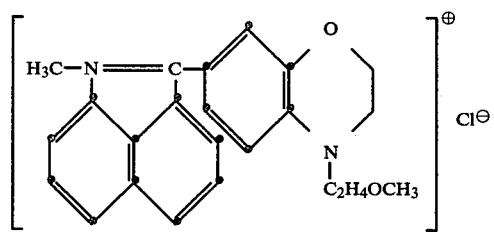

and 0.2 part of the dye of the formula

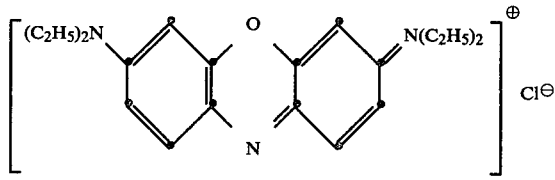

are dissolved in 2000 parts of water with the addition of 4 parts of 40% acetic acid, and to this solution are added 1 part of crystallised sodium acetate and 10 parts of anhydrous sodium sulfate. Into the dye bath thus obtained are introduced, at 60° C., 100 parts of polyacrylonitrile fibres; the temperature is raised within ½ hour to 100° C. and the material is dyed for 1 hour at boiling temperature. The result after rinsing and drying is a neutral blue dyeing, which exhibits no change of colour in artificial light, and which has excellent fastness to decatising, and a good fastness to light.

Excellent blue dyeings having the same good fastness properties are also obtained by using the dye mixtures given in the following Table, the procedure otherwise being as described in Example 2.

are subsequently introduced 1.2 parts of the dye of the formula

TABLE

| No. | Naphtholactam dye | Oxazine dye |
|---|---|---|
| 3 | (structure with H₃COH₄C₂-N=C-, CH₃, N-C₂H₅, Cl⁻) | (structure with H₅C₂/H₅C₂-N, O, N-C₂H₅/C₂H₅, Cl⁻) |
| 4 | (structure with NCH₄C₂-N=C-, N(C₂H₅)₂, ZnCl₃⁻) | (structure with CH₃-N, O, N-C₂H₅/C₂H₅, Cl⁻) |
| 5 | (structure with NCH₄C₂-N=C-, N-C₂H₅, ZnCl₃) | (structure with H/CH₃-N, O, NH₂/CH₃, Cl⁻) |
| 6 | (structure with NCH₄C₂-N=C-, N(C₂H₅)₂, Cl⁻) | (structure with CH₃/H-N, O, N-C₂H₅/C₂H₅, ZnCl₃) |
| 7 | (structure with H₃C-N=C-, N-C₂H₄OCH₃, Cl⁻) | (structure with CH₃/H-N, O, NHC₂H₅/CH₃, Cl⁻) |

EXAMPLE 8

The pH-value of a solution of 3 parts of ammonium sulfate and 1 part of a levelling agent (consisting of fatty amine-ethoxylate-sulfate, fatty amine-ethoxylate and di-2-ethylhexyl-sulfo-succinate) in 3000 parts of water is adjusted with acetic acid to 4.5. 100 parts of mixed yarn from polyacrylonitrile/wool (50/50) are then introduced at 50° C., and pretreated for 10 minutes. There -continued

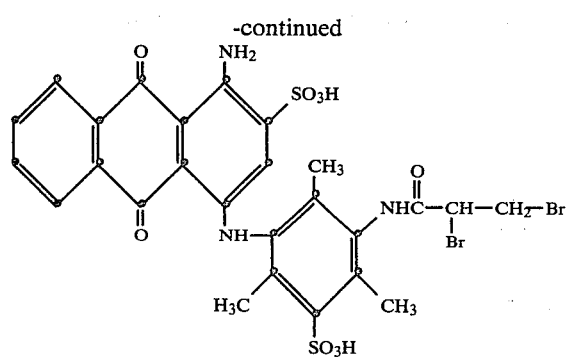

and 0.45 part of the dye of the formula

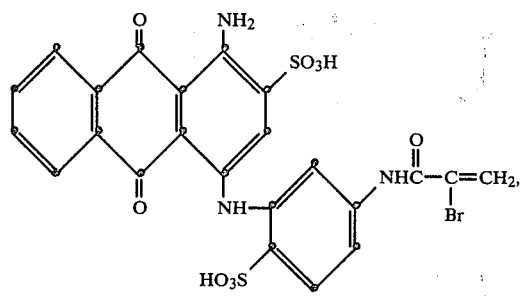

and the dye bath is heated to 80° C. in 30 minutes. After 20 minutes there is added at 80° C. a mixture consisting of 0.3 part of the dye of the formula

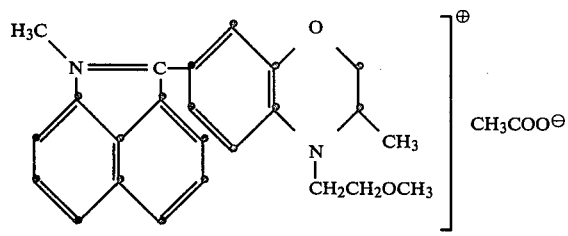

and 0.2 part of the dye of the formula

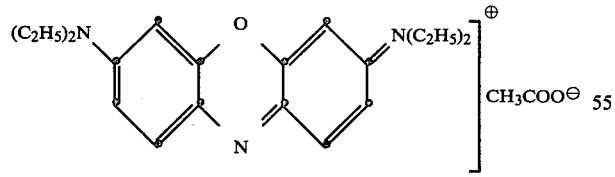

and the bath is heated during 45 minutes to 100° C. The material is dyed for 60 minutes at 100° C.; the bath is then slowly cooled, and the material is rinsed and dried. The result is a mixed yarn dyed blue, with no staining of the wool constituent. This dyeing has fully satisfactory fastness to light, rubbing and wet processing.

What is claimed is:

1. A process for dyeing and printing polyacrylonitrile materials or mixed fabrics containing polyacrylonitrile materials, in which process there is used a mixture of the dyes of the formula I and II or Ia and II

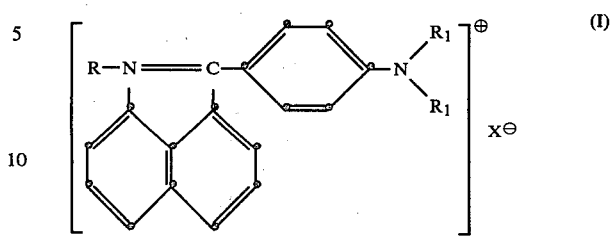

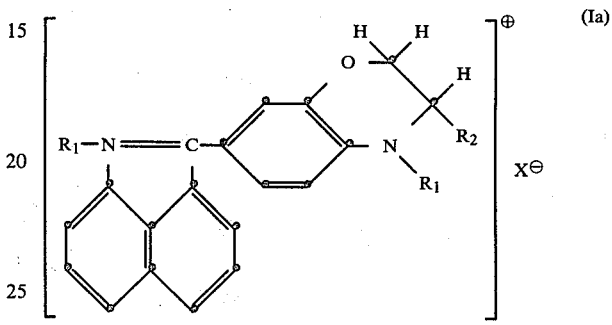

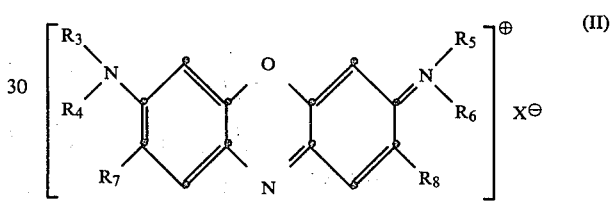

wherein

R is a $C_1$-$C_4$-alkyl group, which is substituted by CN, COO-alkyl-$C_1$-$C_4$, $CONH_2$, CONH(alkyl-$C_1$-$C_4$) or CON(alkyl-$C_1$-$C_4$)$_2$;

$R_1$'s independently of one another are each an unsubstituted $C_1$-$C_4$-alkyl group or a $C_1$-$C_4$-alkyl group which is substituted by CN, OH, $C_1$-$C_4$-alkoxy, COO-alkyl-$C_1$-$C_4$, $CONH_2$, CONH(alkyl-($C_1$-$C_4$), CON(alkyl-$C_1$-$C_4$)$_2$, or the two $R_1$'s in the formula I form together with the N atom a heterocyclic 5- or 6-membered ring;

$R_2$ is hydrogen, an unsubstituted or substituted $C_1$-$C_4$-alkyl group, or an unsubstituted or substituted aryl group;

$R_3$ and $R_5$ independently of one another are each hydrogen, a $C_1$-$C_4$-alkyl group, which is unsubstituted or substituted by CN, OH, aryl, halogen or a $C_1$-$C_4$-alkoxy group, or an alkenyl group having 3 or 4 carbon atoms;

$R_4$ and $R_6$ independently of one another are each a $C_1$-$C_4$-alkyl group, which is unsubstituted or substituted by CN, OH, aryl, halogen or a $C_1$-$C_4$-alkoxy group, or are an alkenyl group having 3 or 4 carbon atoms, or $R_4$ and $R_6$ independently of one another are each an unsubstituted phenyl group, or a phenyl group which may be substituted by a $C_1$-$C_4$-alkyl group, by a $C_1$-$C_4$-alkoxy group or by halogen, and $R_6$ can moreover be hydrogen;

$R_7$ and $R_8$ independently of one another are each hydrogen, a $C_1$-$C_4$-alkyl group or a $C_1$-$C_4$-alkoxy group, and X is an anion.

2. A process according to claim 1, wherein the mixture ratio between the dyes I and II or between Ia and II is 20-90 percent by weight of the dye I or Ia, and 80-10 percent by weight of the dye II.

3. A process according to claim 1, wherein the mixture ratio between the dyes I and II or between Ia and II is 50-80 percent by weight of the dye I or Ia, and 50-20 percent by weight of the dye II.

4. A process according to claim 1, wherein there is used a dye of the formula I wherein R is a $C_1$-$C_4$-alkyl group substituted by CN, and the two $R_1$'s are each the same unsubstituted alkyl group.

5. A process according to claim 1, wherein there is used a dye of the formula I wherein R is an ethyl group substituted by CN, and the two $R_1$'s are each the same ethyl group.

6. A process according to claim 1, wherein there is used a dye of the formula Ia wherein the $R_1$ bound to the naphtholactam ring is an unsubstituted $C_1$-$C_4$-alkyl group, $R_2$ is hydrogen or the methyl or phenyl group, and the $R_1$ bound to the N atom of the morpholino group is a $C_1$-$C_4$-alkyl group substituted by $C_1$-$C_4$-alkoxy.

7. A process according to claim 1, wherein there is used a dye of the formula Ia wherein the $R_1$ bound to the naphtholactam ring is the $CH_3$ group, $R_2$ is hydrogen, and the $R_1$ bound to the N atom of the morpholino group is the $\beta$-methoxyethyl group.

8. A process according to claim 1, wherein there is used a dye of the formula II wherein $R_3$, $R_4$, $R_5$ and $R_6$ are each the same unsubstituted $C_1$-$C_4$-alkyl group, and $R_7$ and $R_8$ are each hydrogen.

9. A process according to claim 1, wherein there is used a dye of the formula II wherein $R_3$, $R_4$, $R_5$ and $R_6$ are each the $C_2H_5$ group, and $R_7$ and $R_8$ are each hydrogen.

10. A process according to claim 1, wherein a polyacrylonitrile/wool mixed fabric is dyed with a dye mixture containing a naphtholactam dye of the formula Ia and an oxazine dye of the formula II according to claim 1.

11. A dye mixture containing a naphtholactam dye of the formula

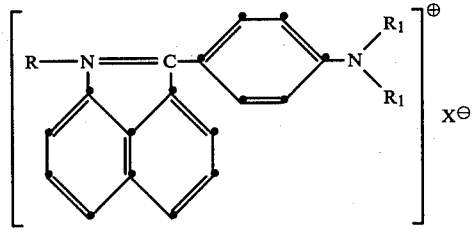
(I)

and an oxazine dye of the formula

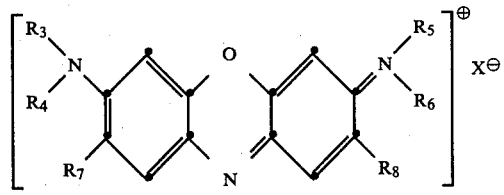
(II)

wherein

R is a $C_1$-$C_4$-alkyl group, which is substituted by CN, COO-alkyl-$C_1$-$C_4$, $CONH_2$, CONH(alkyl-$C_1$-$C_4$) or CON(alkyl-$C_1$-$C_4$)$_2$;

$R_1$'s independently of one another are each an unsubstituted $C_1$-$C_4$-alkyl group or a $C_1$-$C_4$-alkyl group which is substituted by CN, OH, $C_1$-$C_4$-alkoxy, COO-alkyl-$C_1$-$C_4$, $CONH_2$, CONH(alkyl-($C_1$-$C_4$)), CON(alkyl-$C_1$-$C_4$)$_2$, or the two $R_1$'s in formula I form together with the N atom a heterocyclic 5- or 6-membered ring;

$R_3$ and $R_5$ independently of one another are each hydrogen, a $C_1$-$C_4$-alkyl group, which is unsubstituted or substituted by CN, OH, aryl, halogen or a $C_1$-$C_4$-alkoxy group, or an alkenyl group having 3 or 4 carbon atoms;

$R_4$ and $R_6$ independently of one another are each a $C_1$-$C_4$-alkyl group, which is unsubstituted or substituted by CN, OH, aryl, halogen or a $C_1$-$C_4$-alkoxy group, or are an alkenyl group having 3 or 4 carbon atoms, or $R_4$ and $R_6$ independently of one another are each an unsubstituted phenyl group, or a phenyl group which is substituted by a $C_1$-$C_4$-alkyl group, a $C_1$-$C_4$-alkoxy group or halogen, and $R_6$ can moreover be hydrogen;

$R_7$ and $R_8$ independently of one another are each hydrogen, a $C_1$-$C_4$-alkyl group or a $C_1$-$C_4$-alkoxy group, and X is an anion.

12. A dye mixture according to claim 11 containing a naphtholactam dye of formula I and an oxazine dye of formula II in the mixture ratio of 20-90 percent by weight of dye I and 80-10 percent by weight of dye II.

13. A dye mixture according to claim 11 containing a naphtholactam dye of formula I and an oxazine dye of the formula II in the mixture ratio of 50-80 percent by weight of dye I and 50-20 percent by weight of dye II.

14. A dye mixture containing a naphtholactam dye of the formula

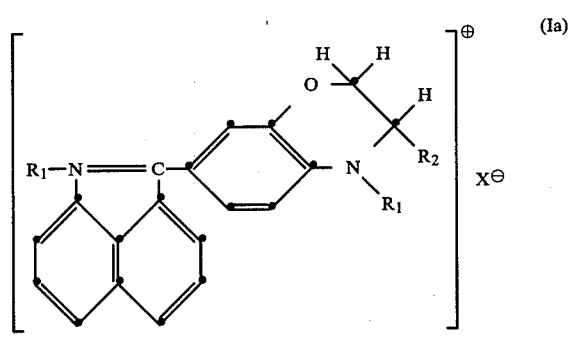
(Ia)

and an oxazine dye of the formula

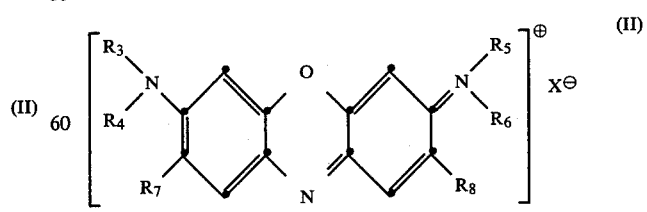
(II)

wherein $R_1$'s independently of one another are each an unsubstituted $C_1$-$C_4$-alkyl group or a $C_1$-$C_4$-alkyl group which is substituted by CN, OH, $C_1$-$C_4$-alkoxy, COO-alkyl-$C_1$-$C_4$, $CONH_2$, CONH(alkyl-($C_1$-$C_4$)), CON(alkyl-$C_1$-$C_4$)$_2$, $R_2$ is hydrogen, an unsubstituted or substituted $C_1$-$C_4$-alkyl group, or an unsubstituted or substituted aryl group;

$R_3$ and $R_5$ independently of one another are each hydrogen, a $C_1$-$C_4$-alkyl group, which is unsubstituted or substituted by CN, OH, aryl, halogen or a $C_1$-$C_4$-alkoxy group, or an alkenyl group having 3 or 4 carbon atoms;

$R_4$ and $R_6$ independently of one another are each a $C_1$-$C_4$-alkyl group, which is unsubstituted or substituted by CN, OH, aryl, halogen or a $C_1$-$C_4$-alkoxy group, or are an alkenyl group having 3 or 4 carbon atoms, or $R_4$ and $R_6$ independently of one another are each an unsubstituted phenyl group, or a phenyl group which is substituted by a $C_1$-$C_4$-alkyl group, a $C_1$-$C_4$-alkoxy group or halogen, and $R_6$ can moreover be hydrogen;

$R_7$ and $R_8$ independently of one another are each hydrogen, a $C_1$-$C_4$-alkyl group or a $C_1$-$C_4$-alkoxy group, and X is an anion.

15. A dye mixture according to claim 14 containing a naphtholactam dye of formula Ia and an oxazine dye of formula II in the mixture ratio of 20–90 percent by weight of dye Ia, and 80–10 percent by weight of dye II.

16. A dye mixture according to claim 14 containing a naphtholactam dye of formula Ia and an oxazine dye of formula II in the mixture ratio of 50–80 percent by weight of dye Ia, and 50–20 percent by weight of dye II.

* * * * *